United States Patent [19]

Kraft et al.

[11] Patent Number: 5,308,370
[45] Date of Patent: May 3, 1994

[54] FILTER DEVICE FOR FILTERING A GAS FLOW

[75] Inventors: Josef Kraft, Berg; Gerrit Scheiderer, Furth, both of Fed. Rep. of Germany

[73] Assignee: Dynamit Nobel Aktiengsellschaft, Troisdorf, Fed. Rep. of Germany

[21] Appl. No.: 8,700

[22] Filed: Jan. 25, 1993

[30] Foreign Application Priority Data

Jan. 23, 1992 [DE] Fed. Rep. of Germany ....... 4201741

[51] Int. Cl.$^5$ .............................................. B01D 39/10
[52] U.S. Cl. ....................................... 55/487; 55/525; 280/736; 280/740
[58] Field of Search .................. 55/487, 525; 280/736, 280/740, 742

[56] References Cited

U.S. PATENT DOCUMENTS

| | | | |
|---|---|---|---|
| 4,322,385 | 3/1982 | Goetz | 280/740 X |
| 4,865,635 | 9/1989 | Cuevas | 55/487 X |
| 4,941,900 | 7/1990 | Cordes | 55/487 X |
| 4,976,759 | 12/1990 | Foltz | 55/487 |
| 5,048,862 | 9/1991 | Bender et al. | 280/736 |
| 5,082,476 | 1/1992 | Kahlbaugh et al. | 55/487 |
| 5,122,270 | 6/1992 | Ruger et al. | 55/487 |

FOREIGN PATENT DOCUMENTS

| | | |
|---|---|---|
| 0134002 | 3/1985 | European Pat. Off. . |
| 0251620 | 1/1988 | European Pat. Off. . |
| 0325111 | 7/1989 | European Pat. Off. . |
| 0332325 | 9/1989 | European Pat. Off. . |

*Primary Examiner*—Charles Hart
*Attorney, Agent, or Firm*—Antonelli, Terry, Stout & Kraus

[57] ABSTRACT

A filter device for filtering a gas flow, especially for filtering the gases produced by a gas generator for an impact protection cushion, comprises a filter element exhibiting several filter material plies of varying permeability lying in series in the flow direction. The filter element is fashioned as a wrapped member produced by winding up a length of filter material. The length of filter material has sectionally different filter materials, preferably wire mesh of differing mesh widths and metal fiber mats. A wrapped member is formed by winding up this filter material web, the wrapping plies of which consist of different materials with varying filter effects. This filter element wrap is inserted, for example, in the annular interspace between the two tubes of a double-tube gas generator. Owing to the rising pressure of the gas to be cleaned, the wrapped member is compacted with the consequence that its filtering function is improved.

28 Claims, 2 Drawing Sheets

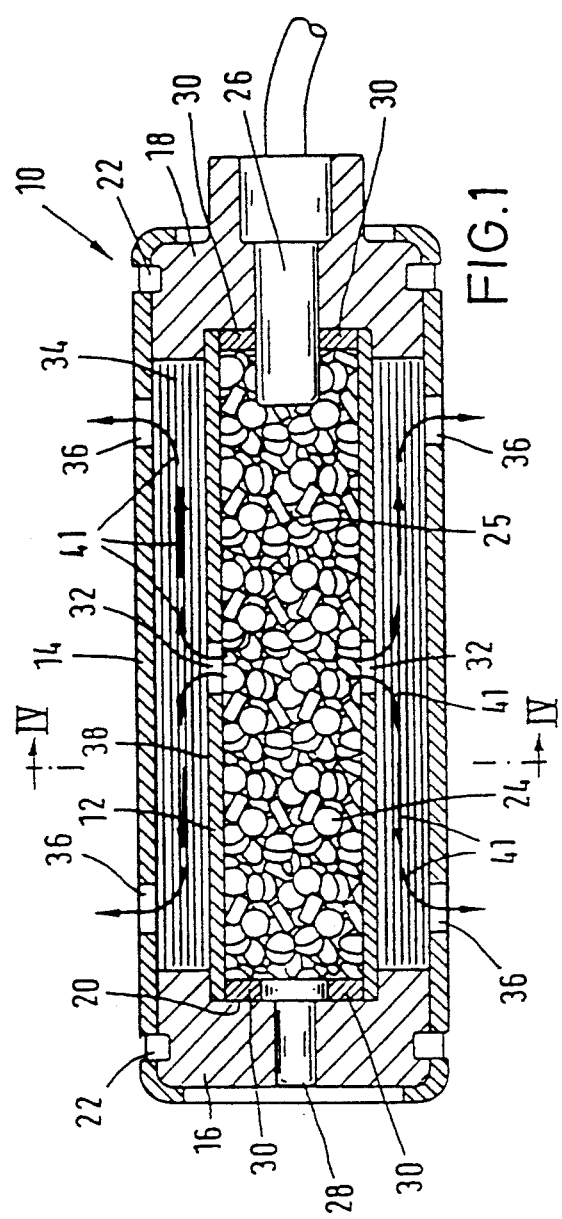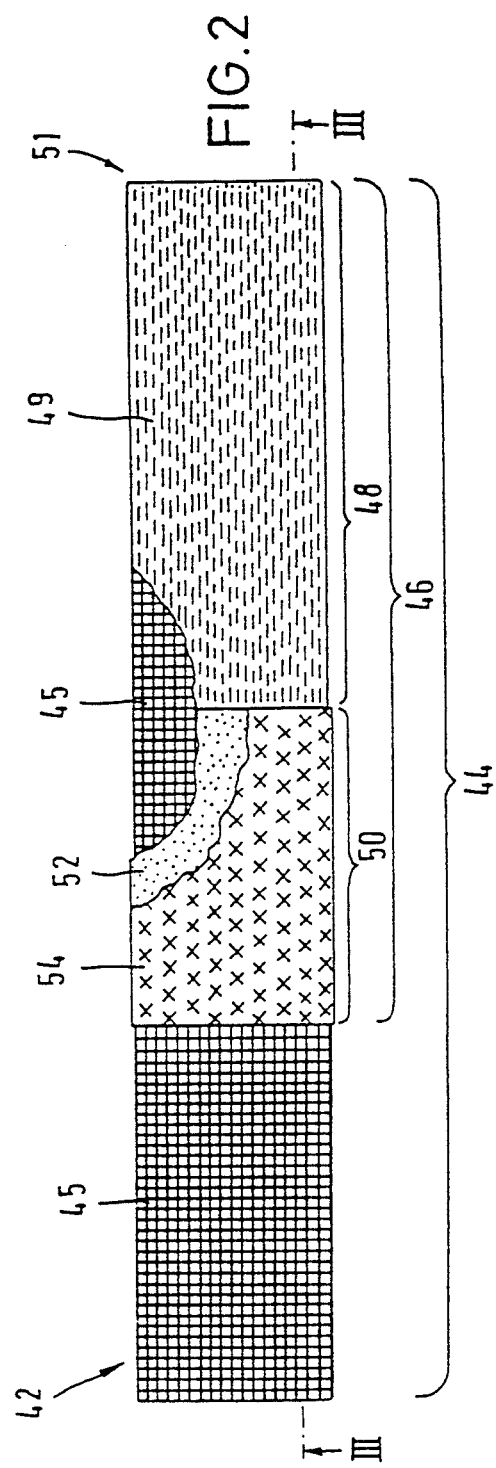

FILTER DEVICE FOR FILTERING A GAS FLOW

BACKGROUND OF THE INVENTION

This invention relates to a filter device for filtering a gas flow, especially for filtering the gas produced by a preferably round or tubular gas generator for an impact protection cushion of a vehicle, with a filter element through which the gas can flow and which exhibits several layers of filter material of differing permeability following one another in the flow direction.

Impact protection cushions for protecting the occupants of automotive vehicles (such collision protection devices being also called "airbag" systems) are filled, in case of need, by pressurized gases produced during the combustion of a gas-releasing charge in a gas generator. In order to retain slag formed during combustion of the gas-releasing material and to cool the slag as well as the combustion gases, the gases flow through a filter element arranged in the gas generator. The filter element consists of several layers of filter material of differing permeability succeeding one another in the flow direction. Wire mesh of varying mesh widths and fine filter mats of metal fibers are utilized as the filter element and/or filter element plies. In case of round and tubular gas generators, the individual wire mesh plies of the filter element exhibit tubular, cup, ring, or hat shapes of varying diameters. The individual thus-formed wire mesh fabrics or fine filter mats are prefabricated as individual cylinders or shaped articles and then assembled. The manufacture of a filter element having this structure is relatively expensive and thus uneconomical.

SUMMARY OF THE INVENTION

The invention is based on the object of providing a filter device for filtering, in particular, the gas produced by a gas generator for a motor vehicle impact protection cushion, the filter element of which can be manufactured in an economical fashion.

In order to attain this object, the invention proposes a filter device of the type heretofore described, the filter element of which is designed as a wrapped member produced by winding up a length of filter material, exhibiting several filter material sections of varying permeability.

The filter element of the filter device according to this invention comprises a wrapped member; the length and/or the strip wound up to form the wrapped member consists herein of filter material. This length of this filter material has several sections or areas, respectively, which consist of differing filter materials with varying permeability, i.e. differing filter effects. The length of filter material can be designed to be single-ply or multiple-ply. In case of a single-ply filter material web, the individual filter material web sections succeed one another in the longitudinal extension of the length of filter material so that the wrapped member exhibits individual winding plies corresponding to the varying filter material sections. In case of a multilayer design of the web of filter material, each layer can consist throughout of one and the same filter material; however, it is just as well possible for one of the layers to exhibit several sections of differing filter material, arranged in side-by-side relationship in the longitudinal extension of the web of filter material.

As mentioned above, the filter materials used for gas filtration comprise stainless steel wire mesh fabrics of differing mesh widths to serve as coarse and superficial filters, and optionally additionally stainless steel metal fiber mats as the fine and in-depth filters. These varying wire mesh fabrics or metal fiber mats, respectively, can be combined or composed, as the web material or as web material sections, simply to form a single-ply or multiple-ply web. In this connection, it is advantageous that the wire mesh and metal fiber mats are present as quadrangular, unshaped flat material sections, the handling and combining of which are comparatively simple. The thus-composed length of filter material is then wound thereafter to form a wrapped member which is inserted in the gas generator. A shaping of each individual ply of filter material of the wrapped-member filter element of the filter device of this invention is unnecessary; this shaping is, rather, produced automatically with the winding step.

The web of filter material is advantageously wound up in such a way that the filter element wrap, upon throughflow of the gas, can be compacted radially from the inside toward the outside, essentially retaining its outer diameter and roll structure. The gas to be cleaned of slag and particles by the filter element flows through the wrapped member in case of a round or tubular gas generator from the inside toward the outside; this is so because the cylindrical filter element surrounds the combustion chamber of the gas generator. With increasing combustion of the gas-releasing material, an amount of combustion gas is produced having an ever increasing volume. As a consequence, the pressure acting on the wrapped member likewise rises. The wrapped member is surrounded or encompassed by the gas generator housing so that unwinding of the web of filter material with increasing pressure of the gas flow is prevented. However, based on the structure of the filter element as a wound-up unit, it is possible that the individual winding layers shift with respect to one another, with the consequence that the individual winding layers are pressed more closely against one another. The "density" of the filter element wrap thus increases with rising pressure of the gas to be cleaned. The wrapped member thus constitutes a filter element wherein the permeability of the material (permeability for slag particles, condensate, and gas) is inversely proportional to the pressure of the gas flow. Exactly this behavior of the filter element is desirable in connection with a gas generator. The compacting of the individual filter plies of a filter element is desirable especially in case the gas exit points of the filter element are offset in the axial direction with respect to the gas inlet points, as is generally the case with round and tubular gas generators. The filter element of such a gas generator thus is also exposed to the flow in the axial direction. In this direction, it is possible to achieve, in the filter device according to the invention, a filter effect that is improved with increasing pressure since the spacing of the individual winding layers is reduced, due to the possibility of a certain shifting of the individual winding layers with respect to one another (a certain unwinding of the wrapped member).

In studies within the scope of tubular gas generator development, the fact could be confirmed that a substantial improvement in slag retention could be obtained by winding up, for example, welded-together wire mesh and metal fine filter mats over wire mesh or fine filter mat cylinders which were nestled and previously individually welded. The slag retention could be raised, with the aid of the filter element wrap according to the filter device of this invention, threefold as compared with the conventional filter elements. This improvement is quite clearly due to the fact that, based on the wrapped structure, a widening of the filter element with regard to its inner diameter can be realized wherein the outer diameter remains substantially unchanged, i.e. wherein the wall thickness of the wrapped member decreases with a reduction in the winding layer distances. This phenomenon can be realized solely in such cylindrical wire mesh/metal fiber mat filter elements, the structure of which permits expansion in spite of the fact that the filter element plies have practically no extensibility. A filter element consisting of a wound-up wire mesh/metal fiber mat web exhibits precisely this property.

In order to provide that each filter web section extends over at least one winding ply, the lengths of the individual filter material sections in the longitudinal extension of the web of filter material should in each case be dimensioned appropriately.

Advantageously, the length of filter material consists of two layers of filter material of which one layer consists throughout of one and the same filter material and wherein the second layer exhibits a second filter material. Both layers of the web of filter material are advantageously firmly joined at one end; this is done, for example, by welding. This end involves the end of the filter material web that is the first in the winding direction. Thereby, a relative shifting of the two layers during the wrapping of the filter material web is possible without this having a negative effect on the winding structure. Insofar as one layer is shorter than the other, the end of the plies shorter in the longitudinal direction of the web of filter material which is the first in the windup direction should be firmly joined to the other ply.

Advantageously, the second ply consists of several filter material sections of differing permeability, arranged in side-by-side relationship in the longitudinal extension of the filter material web. While the first layer of the filter material web consists throughout of one and the same filter material, for example a wire mesh having a specific mesh width, the second layer of filter material web has several wire mesh sections of varying mesh width and optionally also a metal fiber mat as the fine filter. The double-ply filter material web is wound up in such a way that the continuous first (wire mesh) ply is arranged radially inwardly positioned. In such a wrapped member, each second winding layer consists of the continuously extending wire mesh. The interposed winding layers consist of the wire mesh or metal fiber mat sections of the other layer of the web of filter material. When using a comparatively flexible fabric material for the continuous wire mesh of the first layer, then the second layer advantageously has a wire mesh (for example a so-called "braided" material) that is stiffer as compared with the wire mesh of the first layer; then a metal fiber mat section will adjoin the flexurally stiff wire mesh section, the metal fiber mat being provided with a sintered-on wire mesh as the supporting or carrying layer. During the wrapping step, attention should be given to arrange the superficially sintered wire mesh in the flow direction (directly) behind the metal fiber mat. The superficially sintered wire mesh has a small mesh width and prevents exiting of the metallic fibers from the mat ply while gas is flowing therethrough.

The sections of the second plies can be joined to the first ply and/or to one another. However, it is likewise possible for the sections of the second ply to merely lie loosely on the continuous first ply since, with the filter material web being wound up, they are in each case arranged between two winding layers consisting of the material of the first layer of filter material and are thus far fixed in place. The first ply is advantageously longer, by at least the length of the outer circumference of the wrapped member, than the second ply of the web of filter material so that the external winding layer of the wrapped member consists of the wire mesh of the first layer of filter material web, and the metal fiber mat with sintered-on wire mesh is surrounded thereby on the outside. The sections of the second ply of filter material web are arranged in side-by-side relationship with their edges abutting each other and they are optionally joined together. The lengths of the filter material sections of the second layer are chosen so that, with the web of filter material being wound up, each section extends, even after gas has flowed through the wrap, still over at least 360°. The transitional zones of the sections, with the filter material web being wound up, are preferably arranged offset with respect to one another in the circumferential direction, i.e. the roll has a substantially cylindrical shape with uniform thickness extension.

Advantageously, the two layers are joined at the interiorly located filter web end of the wrapped member from which winding up is started. The sections of the second ply of filter material are likewise joined together. The second ply of the web of filter material has a wire mesh connected with the wire mesh of the first ply and having a mesh width that is smaller than the wire mesh of the first filter material ply. The wire mesh section of the second ply is followed by the metal fiber mat with sintered-on wire mesh, having a substantially smaller mesh width than the remaining wire mesh fabrics of the first and second plies. Due to the fact that the first ply is advantageously longer than the second ply by at least the length of the outer circumference of the roll, the wrapped member has an outer winding made up of the wire mesh of the first ply contacting the supporting wire mesh sintered to the metal fiber mat on the outside. The mesh width of such a roll thus decreases, considered in total, from the inside toward the outside. While the superficial filters (the layers of wire mesh) are arranged lying on the inside, the penultimate winding layer is constituted by the in-depth filter (metal fiber mat) which is located on the outside and merely for reasons of stability is additionally surrounded by a surface filter ply (wire mesh of the first layer).

In order to improve handling, the wrap is advantageously surrounded by a cylindrical gas-permeable jacket. This jacket preferably involves a body of filter material made of stainless steel, in particular, shaped into a hollow cylinder. Also, the wire mesh and metal fiber mat plies of the filter element consist advantageously of stainless steel. The hollow-cylindrical jacket holds the roll together which latter tends to flare on account of the rigidity of the material of the filter web. However, the jacket that holds the wrapped member together can also be the cylindrical housing of the round or tubular gas generator. Finally, it is also possible to insert the hollow-cylindrical filter material body of wire mesh, surrounding the wrapped member, into the housing of the gas generator, i.e. the jacket consists, so to speak, of the cylindrical body of filter material and the housing. The housing is provided in its wall with holes as the gas discharge openings.

BRIEF DESCRIPTION OF THE DRAWINGS

One embodiment of the invention will now be described in greater detail with reference to the accompanying drawings, wherein:

FIG. 1 illustrates a longitudinal section through a double-tube gas generator with a filter element wound up into a wrapped body, arranged between the two tubes, FIG. 2 is a top view of the two-ply web of filter material (developed illustration of the filter) of the filter element roll, partially broken away.

DETAILED DESCRIPTION OF THE INVENTION

Figure 3:
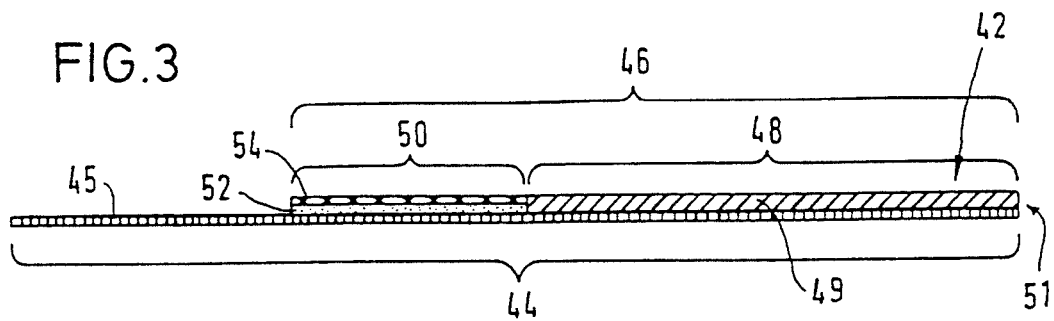
FIG. 3 is a longitudinal section through the length of filter material according to FIG. 2.

FIG. 1 is a schematic view of a double-tube gas generator 10 in longitudinal section. The gas generator 10 has an inner tube 12 and an outer tube 14 arranged coaxially to each other and having differing diameters. The two tubes 12, 14 are sealed at the axial ends by joint sealing lids 16, 18. The sealing lids 16, 18 exhibit mutually opposed round inner recesses 20 into which extend the ends of the inner tube 12. The closing lids 16, 18 are surrounded radially on the outside by the ends of the outer tube 14; the outer tube 14 is firmly joined to the sealing lids 16, 18 by pressure bonding. For this purpose, the sealing lids 16, 18 exhibit outer peripheral grooves 22. By means of notching tools, material of the outer tube 14 is impressed into these peripheral grooves 22. During this step, punched-out V-shaped inner projections are produced which extend into the peripheral grooves 22. This type of connection is especially resistant with respect to forces acting in the axial direction on the sealing lids 16, 18.

The inner tube 12 is filled with a gas-releasing charge 24 in tablet or pellet form (merely indicated in FIG. 1) and constitutes the combustion chamber 25 of the gas generator 10. In the axial direction of the tubular gas generator 10, an electrical igniting unit 26 extends through the sealing lid 18 with a primer charge, not shown, which is ignited electrically. In the other sealing lid 16, a thermal safety initiating device 28 is arranged which, upon overheating of the gas generator 10, ignites the gas-releasing material 24. The vacant surfaces of the sealing lid recesses 20 are provided with ceramic felts 30—or fabrics of (knitted) metal fibers—exerting a certain spring force on the gas-releasing charge material 24 and thus holding the individual tablets or pellets together thereby. In case of vibrations acting on the gas generator 10, limits are thus set for relative motions of the individual pellets and accordingly for any abrasion.

At the area of the center of the axial extension of the inner tube 12, its circumference is equipped with several passage openings 32 by way of which the combustion chamber 25 is connected to the annular chamber 34 between the two tubes 12, 14. Several gas outlet openings 36 are formed in the two axial end sections of the outer tube 14, offset in the axial direction with respect to the passage openings 32 of the inner tube 12. The annular space 34 is filled by a filter element roll 38 consisting of several wire meshes. The structure of the filter element roll 38 will be described with reference to FIGS. 2-4.

As indicated at 40 in FIG. 1, ignition vapors enter the combustion chamber 25 upon ignition of the igniting unit 26. These ignition vapors 40 ignite the gas-releasing material 24; upon deflagration of the latter, combustion gases as well as other combustion products are produced. These solid and liquid other combustion products enter, together with the combustion gases, via the openings 32 of the inner tube 12 into the annular interspace 34 where they are filtered out by the filter element 38 and retained. The flow route of the gas and, respectively, the material is indicated at 41 in FIG. 1. Beside the filtering function, the filter element 38 is also to perform cooling of the gaseous stream as well as the liquid and solid combustion products. The gaseous stream, thus most extensively cleaned of combustion products not in the gaseous phase, exits from the gas generator 10 via the openings 36 in the outer tube 14 in order to inflate, as the utility gas, an impact protection cushion (not shown) in the dashboard zone or steering wheel of an automotive vehicle. The gas stream to be purified flows through the filter element roll in the radial as well as axial direction (see at 41 in FIG. 1) since the openings 32 and 36 in the tubes 12 and 14, respectively, are arranged to be mutually offset in the axial direction of the gas generator 10 in order to establish a maximally long flow path within the filter element 38.

FIGS. 2 and 3 illustrate a top view and a longitudinal sectional view of a portion of a two-ply filter material web 42 from which a wrapped member 38 of the filter element is formed by winding. The length of filter material 42 has a first ply 44 of a first stainless steel wire mesh 45, extending throughout, with a first mesh width of, for example, 0.8 mm and a wire diameter of about 0.25 mm. The length of the first layer of filter material web 44 (extending in the longitudinal direction of the web 42 of filter material) is dimensioned so that the wound-up roll 38 has, in total, four winding layers consisting of the first wire mesh of ply 44. Besides the first ply 44, the web 42 of filter material has a second ply 46 consisting of a first section 48 of filter material and a second section 50 of filter material. The first section 48 is constituted by a second stainless steel wire mesh 49 having a second mesh width smaller than the mesh width of the wire mesh 45 of the first ply 44. The wire mesh 49 of the first section 48 of the second layer of filter material web 46 has a greater bending resistance than the wire mesh 45 and has, for example, a mesh width of 8×85 mesh. The diameter of the warp wires extending in the longitudinal direction of the web 42 of filter material amounts to 0.36 mm, whereas the transversely extending weft wires exhibit a diameter of 0.3 mm. The indicated mesh width of 8×85 mesh means that the wire fabric 45 has 8 warp wires per inch and 85 weft wires per inch. The wire fabric 49 of the first section 46 has a greater bending resistance and a smaller mesh width than the wire fabric 45 of the first layer 42 of filter material web. The wire fabric 49 for the first section 48 of the second ply 46 of filter material web is a so-called "braid".

The wire fabric 49 of the first section 48 of the second web 46 of filter material is joined with one of its ends to one of the ends of the first ply 44 of filter material web. These two joined ends form an end 51 of the length of filter material 42. Joining is effected, for example, by welding, as indicated at the left-hand end of the web 42 of filter material shown in FIG. 2. The other end of the first section 48 lying in the longitudinal extension of the length 42 of filter material is welded together with the second section 50. In this arrangement, the joined ends of the two sections 50, 48 overlap, or, alternatively, the two sections are disposed "edge on edge". The second section 50 is, in turn, of a two-ply structure and exhibits a first ply of metal fiber mat 52 and a stainless steel wire mesh 54 wherein the wire mesh 54 is sintered onto the metal fiber mat 52. The wire mesh 54 has a mesh width of, for example, 0.4 mm and a wire diameter of, for example, 0.125 mm to 0.25 mm. The metal fiber mat 52 has a filtering unit of, for example, about 60 Am and is arranged between the wire mesh 45 of the first ply 44 and the wire mesh 54 of the second section 50 of the second ply 46 of the web 42 of filter material. The first ply 44 of the filter material web has a greater longitudinal extension than the second ply 46; the wire mesh 45 of the first ply 44 thus projects past the free end of the bond of metal fiber mat 52 and wire mesh 54 facing away from the wire mesh 49 of the first section 48 of the second ply 46 of filter material web.

Figure 4:
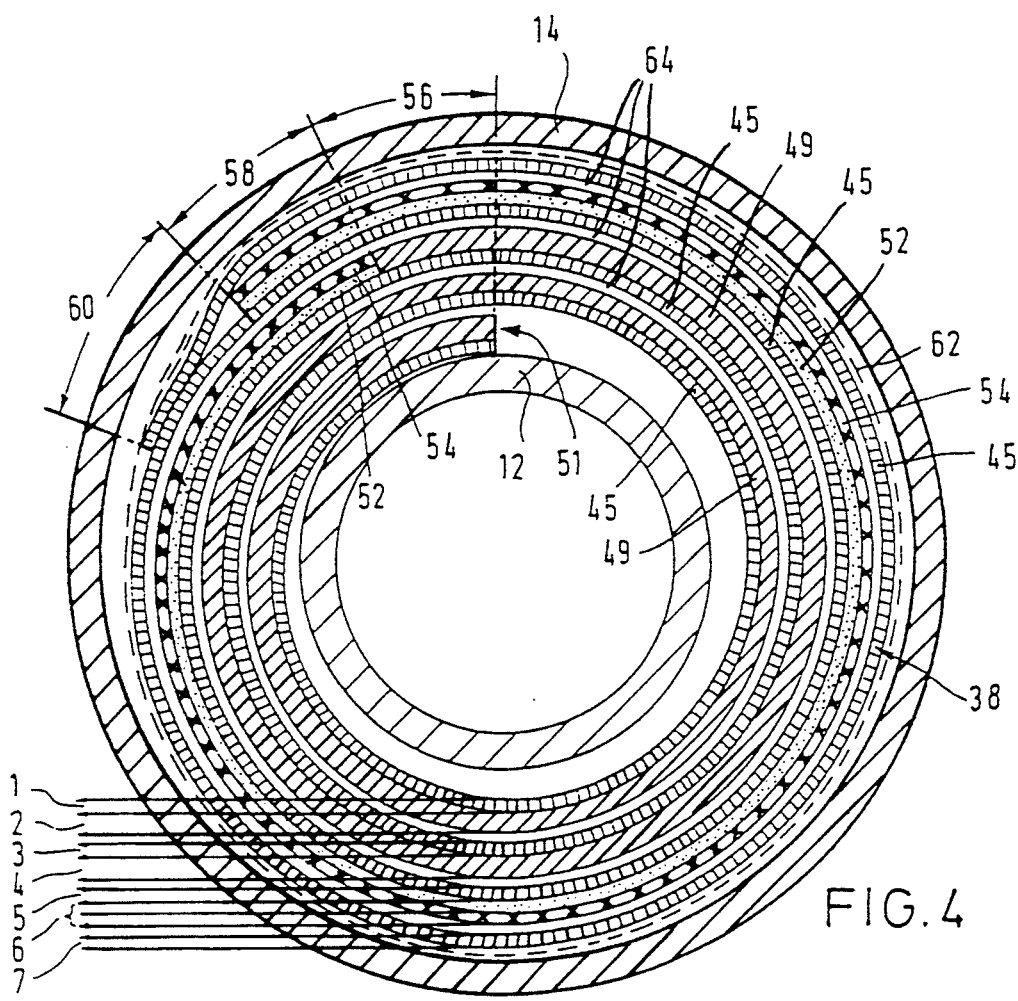
FIG. 4 shows an enlarged section of the filter element roll in the installed condition with a wire mesh hollow cylinder for holding the roll together, in accordance with section line IV—IV of FIG. 1.

The length 42 of filter material illustrated in FIGS. 2 and 3 is wound up into the wrapped member 38 shown in FIG. 4. During this step, rolling up is begun at the end 51 of the web 42 of filter material illustrated on the right-hand side in FIG. 2, where the two layers 44, 46 terminate, which latter are connected to this end. This connection is not absolutely necessary but facilitates winding up since it is ensured without any additional measures that the two plies 44, 46 will not slip with respect to each other. During the rolling up step, the second ply 42 of filter material is at the top; the first ply 44 of the length of filter material thus forms the innermost winding layer of the roll 38. The length of the first section 48 of the second ply 46 of the web of filter material is dimensioned so that it extends, together with the first ply 44 of the web of filter material, over more than two winding layers of the roll 38. As can be seen from FIG. 4, the wire mesh 49 of the first section 48 of the second filter material web ply 46 extends over the second and fourth winding plies; whereas the first and third winding layers are formed by the wire mesh 45 of the first filter material web ply 44. The end of the wire mesh 49 of the second section 48, joined to the composite of metal fiber mat 52 and wire mesh 54, overlaps in this arrangement the interiorly located end of the rolled-up web 42 of filter material by the angular range indicated at 56. The length of the second section 50 of the second filter material web ply 46 is dimensioned so that the composite of metal fiber mat 52 and wire mesh 54 extends over one winding layer, namely the sixth winding of the roll 38, the ends of the second section 50 also overlapping each other, namely by the angular range indicated at 58 in FIG. 4. The length of the first ply 44 of filter material web is chosen, in contrast thereto, so that the first wire mesh 45 extends over, in total, four windings of the wrapped member 38, these being the winding plies 1, 3, 5 and 7. The outside winding of the roll 38 (winding layer 7) is here formed by the wire mesh 45 of the first ply 44 of filter material web. This outside winding surrounds the wire mesh 54 sintered onto the metal fiber mat 52. The first ply 44 of the length of filter material 42 is longer than the second ply 46 by a length larger than the outer circumference of the roll 38 so that the outer end of the first ply 44 projects beyond the sixth winding layer by the angular range indicated at 60 in FIG. 4. In order to provide for improved handling of the roll 38, the latter is surrounded by a wire mesh cylinder 62 as an outer jacket which facilitates insertion of the roll 38 into the outer tube 14. As can furthermore be seen with reference to FIG. 4, the transitional zones between the two sections of the second layer 42 of filter material web, as well as the free end of its second section 50, are arranged to be offset in the circumferential direction with respect to each other and offset with respect to the interiorly located beginning of the winding of the interiorly located end 51 of the roll 38.

The wrapped member or roll 38 constituting the filter element has been described above by means of the materials and wire mesh fabrics indicated. The number, type, as well as size of the plies or their sections, as well as the specification of the individual wire mesh fabrics or metal fiber mats is set forth herein merely by way of example; these parameters are determined, last not least, by the structure and mode of operation as well as the use of the gas generator 10.

With regard to FIG. 4, it should also be noted that, in this figure, the roll 38 and the individual layers are drawn to be thicker in order to be able to render an improved illustration of the structure of the roll 38 in its details. Also the interspaces 64 between the individual winding plies are shown larger. Normally, adjacent winding plies should be in contact with one another. Finally, also the distance of the inner surface of the wrapped member 38 to the inner tube 12 and the distance of the outer surface of the wrapped member 38 or the cylindrical wire mesh 62 to the outer tube 14 do not correspond to actual conditions. Rather, the roll 38 including the wire mesh 62 is in essentially intimate contact with the inner and outer tubes 12 and 14.

For assembling the gas generator 10 shown in FIG. 1, the following procedure is carried out: First of all, the outer tube 14 is crimped to one of the lids 16, 18. Then the inner tube 12 is inserted in the recess 20 of this lid 16 or 18, respectively. The roll 38 is thereafter introduced into the annular space 34. During this step, on account of the nonuniform wall thickness of the roll 38, the inner tube 12 can enter, at its free end, into a position eccentric with respect to the outer tube 14. In order to reestablish the concentricity of both tubes, a centering ring (not illustrated in the figures) is inserted in the annular space 34. Subsequently, for filling the inner tube 12 with the pellets 24, the second lid 18 or 16 is inserted and the outer tube 14 joined to the lid by crimping. The centering ring remains in the annular space 34 between the two tubes 12, 14. During centering of the inner tube 12, the wrapped member 38 is squeezed and correspondingly adapts to the annular space 34.

The filter element roll 38 is traversed by the gas stream to be cleaned radially from the inside toward the outside. During this flow, a pressure acts on the roll 38 in the radially outward direction. Due to this pressure, the wrapped member 38 is urged against the outer tube 14. Since the web 42 of filter material is wound up so loosely or slackly that the individual winding layers, though following one another closely, still have a certain, though only small, spacing (interspace 64) from each other, the outwardly acting pressure leads to an expansion of the roll 38 in inner diameter. The consequence of this is a certain unwinding of the roll 38 in the zone of the interiorly located end 51 which, in turn, has the result that the individual winding laps are compressed. The interspaces 64 between the individual winding laps thus are narrowed, ensuing in an improved filtering effect on the gases flowing, in part, axially through the roll 38. The permeability of the material of the wrapped body 38 decreases in total from the inside toward the outside. By virtue of the compacting of the roll 38 with increasing combustion gas pressure, a filter element is created for a gas generator wherein its permeability is pressure-dependent, the permeability being larger at a lower pressure than toward the end of the combustion process. At the beginning of the combustion process, the filter element roll 38 thus presents a lower resistance to the gaseous stream than is the case toward the end of the combustion. This effect is due, besides being caused by an increasing clogging of the filter element with retained combustion products not in the gaseous phase, also to the compacting of the roll 38.

What is claimed is:

1. A filter device for filtering a gas flow of gases produced by a tubular gas generator for inflating an impact protection cushion, comprising a filter element that can be traversed by the gases and that comprises several plies of metallic filter materials of differing permeability following one another in the flow direction of the gases;

said filter element being a roll formed by winding up a single, continuous length of filter material web, and the length of filter material web comprising several filter material sections of differing permeability; said filter device being adapted to fit within an annular space of the tubular gas generator.

2. A filter device according to claim 1, wherein the length of filter material web is wound in such a way that the roll, during throughflow of the gases, can be compacted radially by the flow of pressurized gas from the inside toward the outside of the roll substantially while retaining its outer diameter.

3. A filter device according to claim 1, wherein the lengths of the filter material sections are in each case dimensioned so that each filter material section extends over at least 360° even with the roll being compacted by the gas flow.

4. A filter device according to any one of claims 1 to 3, wherein the length of the filter material web comprises a first and a second ply of filter material, the first ply consisting throughout of a first filter material section, and the second ply comprising at least one second filter material.

5. A filter device according to claim 4, wherein the first and the second plies of the length of filter material web are firmly joined together in a zone of an end of the ply that is shorter in the longitudinal extension of the length of filter material web.

6. A filter device according to claim 5, wherein the second ply has several filter material sections of differing permeability, these sections being arranged side-by-side in the longitudinal extension of the length of filter material web.

7. A filter device according to claim 6, wherein respectively adjacent filter material sections of the second ply are firmly joined together.

8. A filter device according to claim 7, wherein the free end of an exteriorly disposed filter material section of the second ply is firmly joined to an end of the first ply.

9. A filter device according to claim 6, wherein the filter material sections of the second ply are joined together with the edges in abutting relationship.

10. A filter device according to claim 6, wherein the length of filter material web is wrapped in such a way that each filter material section of the second ply extends, even after gases have flowed through the roll still over at least 380°, and transitional zones of the filter material sections, with the length of filter material web having been rolled up, are arranged offset with respect to one another in a circumferential direction.

11. A filter device according to claim 4, wherein the first and the second plies are firmly joined together at one of their ends lying in the longitudinal extension, and the first ply is longer than the second ply by at least a length of the outer circumference of the roll.

12. A filter device according to claim 4, wherein the length of filter material web is wound in such a way that the first ply of continuously extending filter material is arranged, with each winding lap to be located radially on the inside.

13. A filter device according to claim 1, wherein the roll is surrounded by a cylindrical gas-permeable metal jacket which facilitates insertion into the tubular gas generator.

14. A filter device according to claim 13, wherein the jacket consists of a filter material member made of stainless steel, formed into a hollow cylinder.

15. A filter device according to claim 13, wherein the jacket is a hollow-cylindrical metallic housing provided with holes in a wall.

16. A filter device according to claim 13, wherein the jacket comprises a metallic filter material member shaped into a hollow cylinder, and a hollow-cylindrical housing of the gas generator with holes in its wall, being arranged to surround the filter material member and associated jacket.

17. A filter device according to claim 16, wherein the length of filter material web comprises wire mesh sections of differing mesh widths.

18. A filter device according to claim 17, wherein the length of filter material web additionally comprises one or several metal fiber mat sections.

19. A filter device according to claim 18, wherein the metal fiber mat sections are in each case bonded to a wire mesh for reinforcing purposes.

20. A filter device according to any one of claims 17 to 19, wherein all of the wire mesh sections and any metal fibers of the metal fiber mats consist of stainless steel.

21. A filter device according to claim 4, wherein the first ply of the length of filter material web consists of a first wire mesh with a first mesh width, the second ply comprises first section of a second wire mesh, the mesh width of which is smaller than that of the first wire mesh of the first ply, and comprises a second section with a metal fiber mat to which is sintered a third wire mesh having a mesh width smaller than that of the second wire mesh of the first section of the second ply of the length of filter material web.

22. A filter device according to claim 21, wherein the dimensions of the plies of the length of filter material web and their sections are set as well as arranged, and the length of filter material is wound up in such a way that, as seen in each case from the inner end of the roll, the first wire mesh extends over more than four winding layers, namely the first, the third, the fifth, and the seventh winding layer, the second wire mesh extends over more than two winding layers, namely the second and the fourth winding layers, and the metal fiber mat with the third wire mesh extends over more than one winding layer, namely the sixth winding layer.

23. An assembly according to claim 17, wherein the length of the metallic filter material web comprises a first and a second ply of metallic filter material, the first ply consisting throughout of a first metallic filter material section, and the second ply comprising at least one second metallic filter material, sand filter device further comprising a cylindrical gas-permeable metal jacket which surrounds the roll and which facilitates insertion of the roll into the tubular gas generator.

24. A filter device according to claim 1, wherein the length of filter material web comprises wire mesh sections of differing mesh widths.

25. A filter device according to claim 24, wherein the length of filter material web additionally comprises one or several metal fiber mat sections.

26. An assembly of a filter device and tubular gas generator, said gas generator comprising a perforated inner tube, a perforated outer tube arranged coaxially with the inner tube and having a diameter greater than the inner tube, sealing mean for sealing each axial end of the inner and outer tubes, a gas-generating material located in the inner tube and means for igniting the gas-generating material to generate pressurized gases; said filter device being arranged between the inner and outer tubes to filter the gases and to retain slag particles formed during combustion of said gas-generating material and said filter device comprising a filter element that can be traversed by the gases and that a comprises several plies of metallic filter material of differing permeability following one another in the flow direction of the gases; said filter element being a roll formed by winding up a single, continuous length of metallic filter material web, and the length of metallic filter material web comprising several metallic filter material sections of differing permeability.

27. An assembly according to claim 26, wherein the length of metallic filter material web comprises wire mesh sections of differing mesh widths.

28. An assembly according to claim 27, wherein the length of metallic filter material web additionally comprises one or several metal fiber mat sections.

* * * * *